Jan. 16, 1940.     J. D. FRIEND     2,187,307
BEARING
Filed Aug. 3, 1938
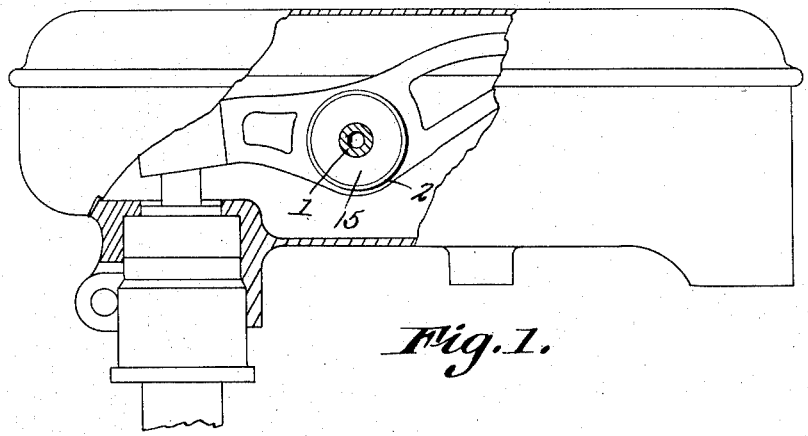
Fig. 1.
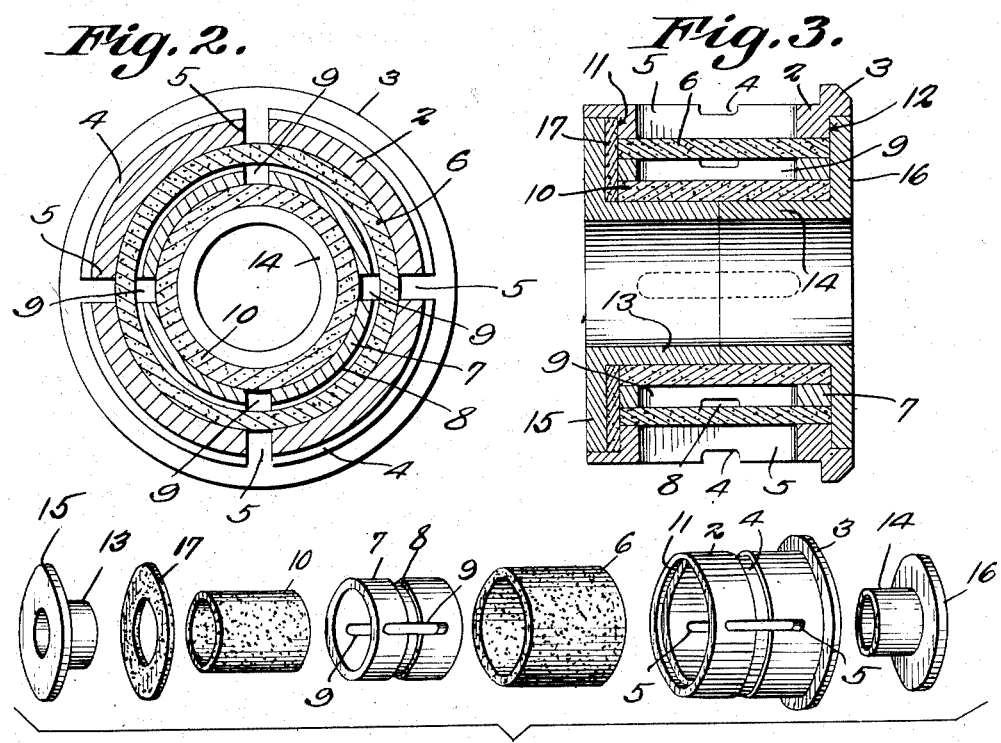
Fig. 2.     Fig. 3.
Fig. 4.
J. D. Friend
INVENTOR.
BY C. A. Snow & Co.
ATTORNEYS.

Patented Jan. 16, 1940

2,187,307

UNITED STATES PATENT OFFICE 2,187,307

BEARING

J. Don Friend, Hawthorne, N. J.

Application August 3, 1938, Serial No. 222,939

8 Claims. (Cl. 308—108)

This invention relates to bearings and while it has been found especially advantageous for use with the rocker arms of air craft engines, it obviously can be employed wherever it is desired to use a bearing lubricated under pressure.

An object of the invention is to provide a device made up of concentric bearing members and interposed spacers, the latter being of porous metal and some of the members being slotted so that lubricant under pressure can be caused to seep through the spacers and become pocketed in areas provided between the members of the bearing thereby insuring proper application of lubricant to the wearing surfaces.

Another object of my invention is to provide a bearing including an inner and outer race, and a pair of full floating bronze bushings of the porous, graphite sintered type spaced by a steel separator bushing, in combination with a bronze thrust washer, the said outer race and steel separator bushing being provided with annularly disposed lubricating channels and a plurality of spaced, radially extending lubricating slots whereby the lubricant under pressure may be fed from the exterior or from the interior to and through the full floating porous metal bushing to lubricate the shaft upon which the bearing is mounted.

Another object of my invention is to provide a bearing consisting of an outer race having an annular shoulder at one end and formed with a circumferentially extending lubricating slot, a plurality of radially disposed lubricating passages extending through the race, and a plurality of full floating porous metal bushings positioned within the outer race and spaced by a steel separator bushing also formed with a circumferentially disposed lubricating slot and with a plurality of radially disposed passages formed through its wall, together with a bronze thrust washer adapted to engage the ends of the porous metal bushings and the steel separator bushing, said thrust washer being held in place by means of a shoulder formed on one of the two-part similarly formed inner race members, which in turn are mounted upon any suitable shaft.

Another object of my invention is to provide a bearing which will include a plurality of full floating porous metal bushings spaced by a steel or non-porous separator bushing, and lubricated either externally or internally, as distinguished from a bearing utilizing a porous metal bushing which is rigidly installed.

A still further object is to provide a bearing which can be lubricated either from the exterior or the interior, as desired.

A further object of my invention is to provide a bearing including a plurality of full floating porous metal bushings separated by a steel separator bushing, whereby a plurality of lubricated bearing surfaces will be provided.

Another object of my invention is to provide an improved bearing formed with a plurality of spaced full floating porous metal bushings, the same being lubricated by pressure, and which will be highly efficient in operation and relatively inexpensive to manufacture.

Other objects will appear as the description proceeds.

In the accompanying drawing:

Figure 1 is an elevation of a rocker arm mechanism for aircraft engines, equipped with the improved bearing;

Figure 2 is a transverse sectional view of the bearing;

Figure 3 is a longitudinal sectional view of the bearing, and

Figure 4 is a perspective view wherein the several elements are spaced apart.

In Fig. 1 there appears a hollow shaft 1 forming a part of the rocker arm bearing assembly for an engine.

The bearing characterizing the invention comprises an outer non-porous race member 2 formed at one end with an annular shoulder 3 and provided with a circumferentially extending lubricant groove 4, and with a plurality of radially disposed lubricant slots 5 extending through the body of the outer race member and in communication with the groove 4. Positioned within the outer race member 2 is a full floating metal bushing 6 of bronze or any desired porous material, the outer surface of the bushing being in contact with the inner surface of the outer race member 2.

Disposed within the bushing 6 and in contact with the inner surface thereof is a steel or non-porous separator bushing 7 formed with a circumferentially extending lubricant groove 8 and with a plurality of radially extending lubricant slots 9 in its body portion and in communication with the groove 8. A second porous metal bushing 10 is provided and is received within the bushing 7, in contact with the inner surface thereof. The bushing 10 is formed of bronze or any other porous metal.

The opposite ends of the outer race member 2 are provided with annular recesses or seats 11 and 12, the purpose of which will be disclosed hereinafter. Positioned upon the seat 11 of the outer race member 2 and in contact with the end of the bushings 6 and 10 and the separator bushing 7, is a bronze thrust washer 17 of porous metal or any other desired material.

The inner race for the bearing comprises a pair of cooperating hub members 13 and 14, which are provided with annular flanges 15 and 16 respectively, the hub members being inserted into the opposite ends of the bearing, within the second bushing 10 and in contact with the inner surface thereof. The annular flange 15 of the hub member 13 is received within the thrust side of the bearing and is in contact with the outer surface of the washer 17, the outer surface of the flange being flush with the end of the outer race member 2. The annular flange 16 of the hub member 14 is received within the annular seat 12 and is in contact with the end of the bushings 6 and 10, and also in contact with the bushing 7. The outer surface of the flange 16 is flush with the outer surface of the annular shoulder 3 on the outer race member 2. The inner ends of the hub members 13 and 14 are in contact.

The left hand side of the bearing in Figure 3 is the thrust side of the bearing, and the thrust washer 17 serves effectively to take care of the thrust which otherwise would cause undue wear on the several parts of the assembly.

Although the method of lubricating the bearing has not been illustrated, it will be understood that the lubricating may be effected by external pressure, the oil under pressure being pocketed in the circumferential lubricant groove 4 and flowing through the lubricant slots 5 to the outer full floating bushing 6, through which the oil will seep and become pocketed in the circumferential lubricant groove 8 in the steel separator bushing 7. It will flow also through the slots 9 in the bushing 7, to the second or inner bushing 10. The lubricant will seep through the bushing 10 and reach the outer surface of the hub or inner race members 13 and 14. Thus, four separate and distinct bearing surfaces are provided, and should one bearing surface become ineffective for any reason, there will be three other surfaces to carry the load, any one of which, under normal operating conditions, will provide sufficient bearing area.

It has been found that the device forming the subject matter of this application will operate efficiently for a long period of time and will reduce to a minimum the wear on the several parts.

Changes may be made, within the scope of what is claimed, without departing from the spirit of the invention.

What is claimed is:

1. A bearing including an outer and an inner race, a plurality of porous metal bushings between said races, a separator between said porous metal bushings, and said outer race and separator being formed with circumferential lubricant grooves and with a plurality of radial slots formed through their bodies and in communication with said grooves.

2. A bearing including an outer and an inner race, a plurality of porous metal bushings between said races, a separator between said porous metal bushings, said outer race and separator being formed with circumferential lubricant grooves and with a plurality of radial slots in their bodies and in communication with said grooves, and a porous metal thrust washer between said races contacting the ends of said porous metal bushings and said separator.

3. A bearing including an outer and an inner race, a plurality of porous metal bushings arranged in spaced relation between said races, said outer race being provided with annularly disposed recessed seats in its ends, annular flanges on said inner race and engaged with the seats in the outer race, and a porous metal thrust washer interposed between an annular flange on the inner race and the adjacent ends of the porous metal bushings.

4. A bearing including an outer and an inner race, a plurality of porous metal bushings arranged in spaced relation between said races, said outer race being provided with annularly disposed recessed seats in its ends, annular flanges on said inner race and engaged with the seats in the outer race, a separator bushing interposed between said porous metal bushings and a porous metal thrust bearing interposed between one of the annular flanges on the inner race and the adjacent ends of said porous metal bushings and said separator.

5. A bearing including an outer race and a split inner race formed with annularly disposed flanges on its outer ends, a plurality of porous metal bushings arranged between said races, a separator bushing between said porous metal bushings, a thrust washer between one of the flanges on the inner race and the adjacent ends of the porous metal bushings and separator, and said outer race being provided with a circumferential lubricating groove and with a plurality of radial lubricant slots in its body.

6. A bearing including an outer race and a split inner race formed with annularly disposed flanges on its outer ends, a plurality of porous metal bushings arranged between said races, a separator bushing between said porous metal bushings, a thrust washer between one of the flanges on the inner race and the adjacent ends of the porous metal bushings and separator, and said outer race and separator between said porous metal bushings being provided with circumferential lubricant grooves and with a plurality of radial lubricant slots in their bodies in communication with said grooves.

7. A bearing including inner and outer bearing elements, a slotted separator therebetween having an annular groove, porous metal spacers between said elements and the separator, one of said elements having an annular groove and a slot, said grooves and slots constituting lubricant pockets and outlets bridged by the spacers, said elements, separator and spacers being concentric and relatively rotatable.

8. A bearing including inner and outer bearing elements, a slotted separator therebetween having an annular groove, porous metal spacers between said elements and the separator, one of said elements having an annular groove and a slot, said grooves and slots constituting lubricant pockets and outlets bridged by the spacers, said elements, separator and spacers being concentric and relatively rotatable, and a thrust transmitting washer of porous metal interposed between one end of one of said bearing elements and the corresponding ends of the spacers, separator and other bearing element.

J. DON FRIEND.